(12) United States Patent
Takimoto et al.

(10) Patent No.: US 8,302,989 B2
(45) Date of Patent: Nov. 6, 2012

(54) AIRBAG AND AIRBAG SYSTEM

(75) Inventors: Takayuki Takimoto, Tokyo (JP);
Yoshihiro Kobayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 1130 days.

(21) Appl. No.: 12/162,969

(22) PCT Filed: Dec. 26, 2006

(86) PCT No.: PCT/JP2006/325922
§ 371 (c)(1),
(2), (4) Date: Jul. 31, 2008

(87) PCT Pub. No.: WO2007/088694
PCT Pub. Date: Aug. 9, 2007

(65) Prior Publication Data
US 2009/0008910 A1    Jan. 8, 2009

(30) Foreign Application Priority Data

Feb. 3, 2006   (JP) ................................. 2006-027301

(51) Int. Cl.
*B60R 21/217* (2011.01)
*B60R 21/36* (2011.01)

(52) U.S. Cl. ..................... 280/728.2; 180/274; 280/735; 280/741

(58) Field of Classification Search .................. 180/274; 280/728.2, 730.1, 735, 736, 741; *B60R 21/217, B60R 21/36*
See application file for complete search history.

(56) References Cited

U.S. PATENT DOCUMENTS

| | | | | |
|---|---|---|---|---|
| 4,153,273 A * | 5/1979 | Risko | ............................. | 280/740 |
| 6,357,786 B1 | 3/2002 | Higashi | | |
| 6,669,226 B2 * | 12/2003 | Fowler et al. | ............... | 280/728.2 |
| 6,843,501 B1 * | 1/2005 | Koh | ........................... | 280/728.2 |
| 6,920,954 B2 | 7/2005 | Hashimoto et al. | | |
| 7,090,243 B2 * | 8/2006 | Igawa | ........................ | 280/728.2 |
| 7,306,257 B2 * | 12/2007 | Yoshikawa et al. | ........ | 280/728.2 |
| 7,341,274 B2 * | 3/2008 | Mori et al. | .................. | 280/728.2 |
| 7,396,042 B2 * | 7/2008 | Mabuchi et al. | ........... | 280/730.2 |
| 7,434,832 B2 * | 10/2008 | Umehara | .................... | 280/730.2 |
| 7,611,195 B2 * | 11/2009 | Yoshikawa et al. | ........ | 297/216.1 |
| 7,712,767 B2 * | 5/2010 | Takahashi et al. | ......... | 280/728.3 |
| 7,845,454 B2 * | 12/2010 | Takimoto et al. | ............. | 180/274 |
| 2009/0045606 A1 * | 2/2009 | Yoshikawa et al. | ........ | 280/728.2 |

FOREIGN PATENT DOCUMENTS

| | | |
|---|---|---|
| JP | 09-169253 A | 6/1997 |
| JP | 2000-095058 A | 4/2000 |
| JP | 2001-047961 A | 2/2001 |
| JP | 2004-291887 A | 10/2004 |
| WO | WO 2007099765 A1 * | 9/2007 |

* cited by examiner

*Primary Examiner* — Joseph Rocca
*Assistant Examiner* — Laura Freedman
(74) *Attorney, Agent, or Firm* — Fitch Even Tabin & Flannery, LLP

(57) ABSTRACT

An airbag having an inflator therein and an airbag system equipped with the airbag are provided, the inflator having a harness taken to the outside through a harness through opening, and the airbag having high inflation durability. An airbag has an inflator therein. Three stud bolts project from an inflator holder attached to the inflator. The bottom of the airbag has three bolt insertion holes through which the stud bolts are passed. A harness through opening is provided between adjacent bolt insertion holes, the harness through opening being for taking a harness for passing electric current to the initiator of the inflator out of the airbag. The harness through opening is shaped like a slit, which extends in the direction substantially orthogonal to the line connecting the bolt insertion holes.

3 Claims, 4 Drawing Sheets

AIRBAG AND AIRBAG SYSTEM

CROSS-REFERENCE TO RELATED APPLICATIONS

This application is a U.S. national phase application filed under 35 U.S.C. §371 of International Application PCT/JP2006/325922, filed on Dec. 26, 2006, designating the United States, which claims priority from JP 2006-027301, filed Feb. 3, 2006, which are hereby incorporated herein by reference in their entirety.

FIELD OF THE INVENTION

The present invention relates to an airbag having an inflator therein and an airbag system equipped with the airbag, and more particularly, it relates to an airbag and an airbag system which are preferable as a pedestrian airbag which, in the event of a collision with a pedestrian or the occupant of a bicycle or a motorcycle (hereinafter, referred to as a pedestrian or the like) during driving, inflates along the outer surface of the vehicle body to catch the pedestrian or the like, and as a pedestrian airbag system.

BACKGROUND OF THE INVENTION

It is known in the art to provide a pedestrian airbag system in which, in the event of a collision with a pedestrian or the like during driving, an airbag is inflated along the vehicle body to catch the pedestrian or the like. Japanese Unexamined Patent Application Publication No. 2004-90795 describes a pedestrian airbag system in which an airbag is inflated along the front end, the cowl top, and the right and left A-pillars of the car to protect a pedestrian or the like in the event of a collision therewith.

This pedestrian airbag system has an inflator in the airbag, as shown in FIG. 3. This inflator is shaped like a rod, to which a plurality of mounting brackets (inflator holders) is attached in different positions of its length. A mounting bolt projects from each of the mounting brackets. The bolts pass through the airbag to project outward. The inflator and the airbag are fixed to an airbag case with the bolts.

Japanese Unexamined Patent Application Publication No. 2004-90795 does not clearly describe the position through which a harness for passing electric current to the initiator of the inflator in the airbag is taken out of the airbag.

SUMMARY OF THE INVENTION

It is an object of the present invention to provide an airbag having an inflator therein, in which the harness of the inflator is taken out through a harness through opening, and having high inflation durability with a relatively simple structure, and an airbag system equipped with the airbag.

An airbag according to a first aspect of the invention is an airbag having an inflator therein and a plurality of bolt insertion holes through which inflator mounting bolts are inserted, wherein a harness insertion opening for passing a harness connecting to the inflator therethrough is disposed between the bolt insertion holes.

The harness insertion opening may be shaped like a slit and may extend in the direction orthogonal to the line connecting the bolt insertion holes.

The harness insertion opening may have a size that allows the inflator to pass through.

An airbag system according to a second aspect of the invention includes: the airbag according to the first aspect; an inflator disposed in the airbag; bolts passed through the bolt insertion holes of the airbag, for fixing the inflator; and a harness connecting to the inflator and taken out of the airbag through the harness insertion opening.

The bolt may project from the inflator or an inflator holder.

BEST MODE FOR CARRYING OUT THE INVENTION

In the case of a general rod-like inflator, a harness extends from one end of the length of the inflator. Accordingly, the airbag has a harness insertion opening in the position around the inflator and adjacent to the end of the inflator, through which the harness is taken out of the airbag.

However, with this structure, if the portion of the airbag around the inflator rises with the inflation of the airbag, the vicinity of the harness insertion opening may come into contact with the end of the inflator. The periphery of the harness insertion opening therefore needs reinforcing sewing or the like to improve the durability of the airbag, leading to an increase in the number of processing steps needed to manufacture the airbag.

In contrast, the airbag and the airbag system of the invention has an inflator in the airbag. A harness insertion opening for taking a harness for passing electric current to the harness out of the airbag is disposed between the inflator-fixing-bolt insertion holes of the airbag, that is, under the middle of the length of the inflator. This prevents the vicinity of the harness through opening from coming into contact with the end of each inflator even if the part of the airbag around the inflator rises with the inflation of the airbag. This provides the airbag with high durability even if the periphery of the harness through opening is not excessively reinforced.

In the invention, the harness through opening may be shaped like a slit. This increases the closing performance of the harness through opening. Since the slit-shaped harness through opening is provided in the direction orthogonal to the line connecting the bolt insertion holes, the inflator holder crosses over the slit-shaped harness through opening, providing the inflator with high harness-through-opening sealing effect.

In the invention, the harness insertion opening may be of the size allowing the inflator to pass through. This allows the inflator to be inserted into the airbag through the harness insertion opening, eliminating the need for another inflator insertion opening of the airbag, and thus simplifying the structure of the airbag.

The harness connected to the inflator may be left in the harness insertion opening when the inflator is inserted into the airbag through the harness insertion opening. This can save the labor for taking the harness out of the airbag 5 later and can simplify the operation of assembling the airbag system.

The bolts to be inserted into the bolt insertion holes may project from the inflator itself or from the inflator holder attached to the inflator.

DETAILED DESCRIPTION OF THE PREFERRED EMBODIMENTS

Figure 1:
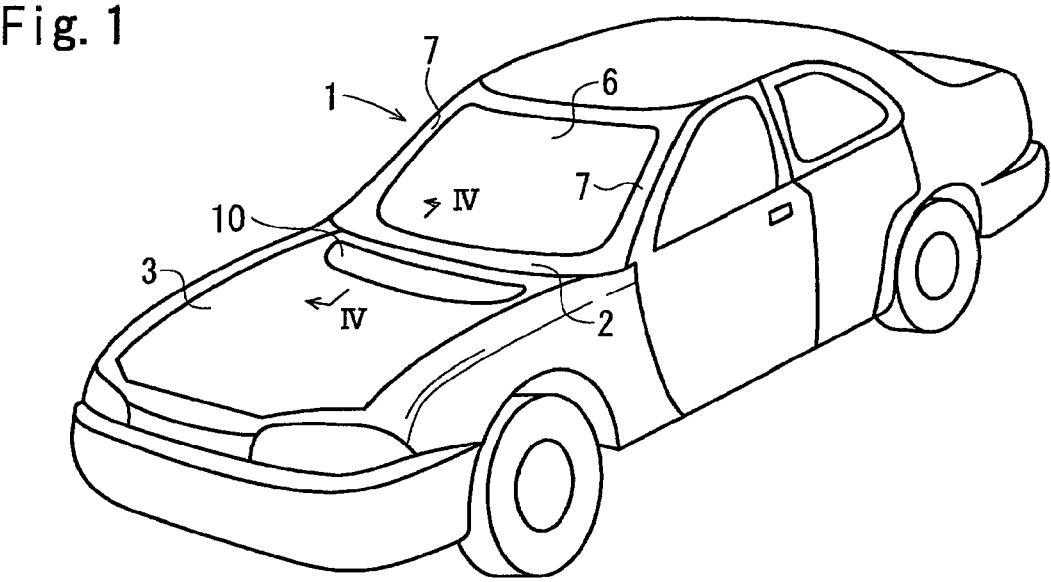
FIG. 1 is a perspective view of a car equipped with a pedestrian airbag system according to an embodiment of the invention.
Figure 2:
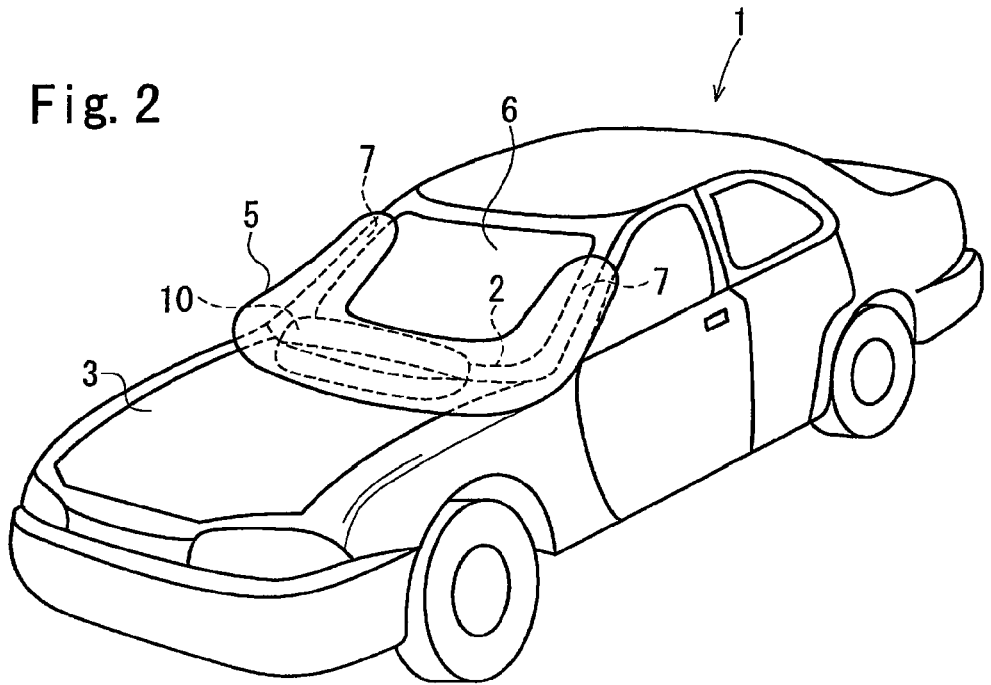
FIG. 2 is a perspective view of the car of FIG. 1, with the airbag in an inflated state.
Figure 3:
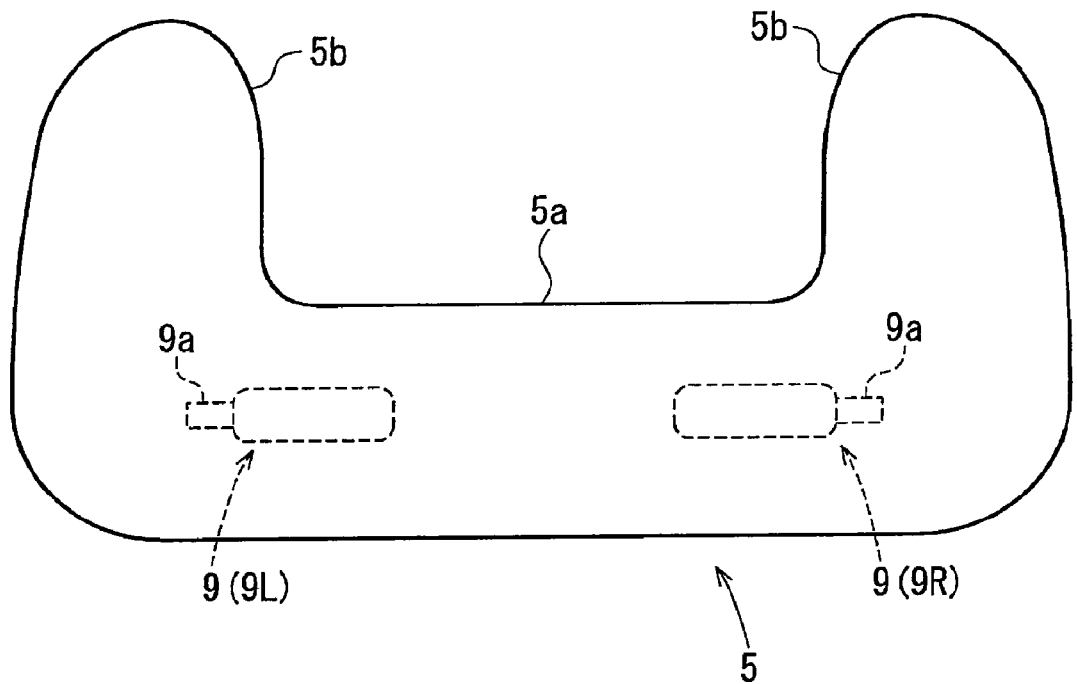
FIG. 3 is a plan view of the airbag.
Figure 4:
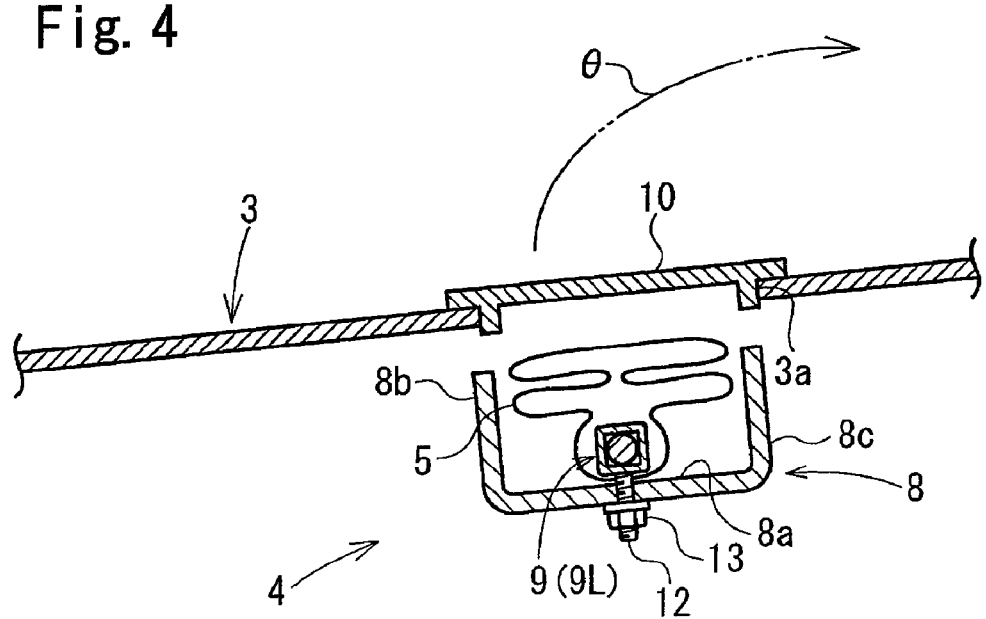
FIG. 4 is a sectional view taken along line IV-IV of FIG. 1.
Figure 5A:
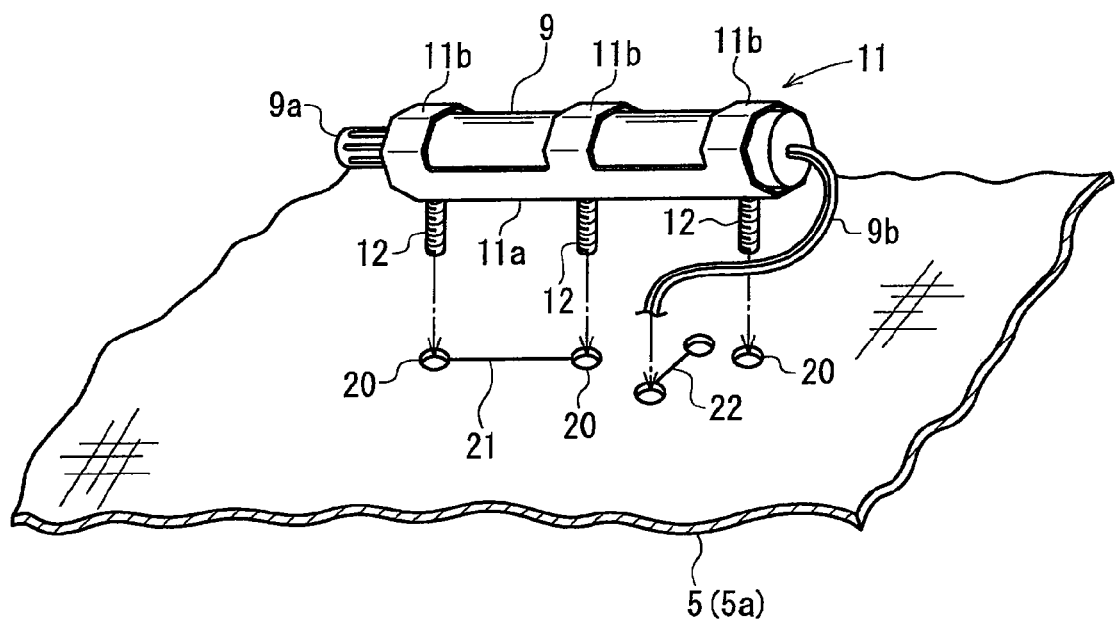
FIGS. 5*a* and 5*b* are diagrams illustrating the vicinity of the inflator mount portion of the airbag.
Figure 5B:
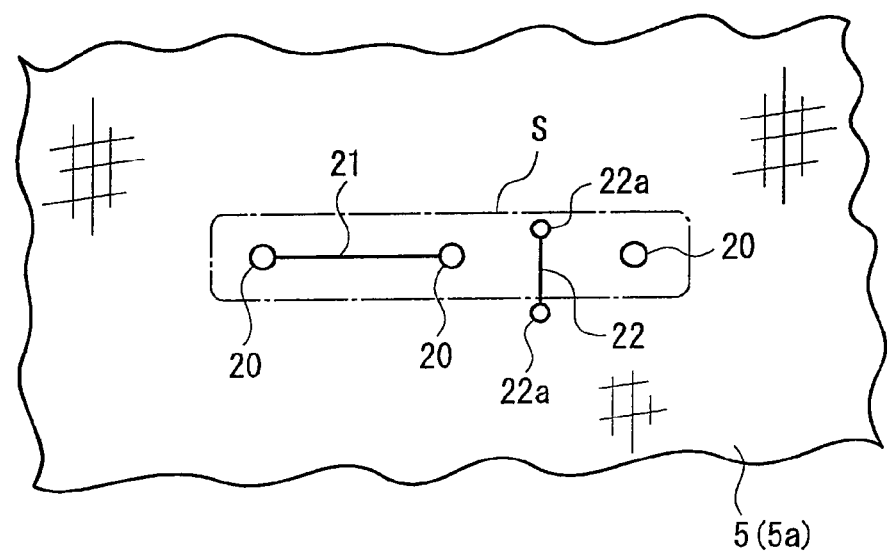

The present invention will be further illustrated with examples below, with reference to the drawings. FIG. 1 is a perspective view of a car equipped with an airbag system according to an embodiment of the invention; FIG. 2 is a perspective view of the car of FIG. 1, with the airbag in an inflated state; FIG. 3 is a plan view of the inflated airbag; FIG. 4 is a sectional view taken along line IV-IV of FIG. 1; FIG. 5a is an exploded perspective view of the vicinity of the inflator mount portion of the airbag; and FIG. 5b is a plan view of the vicinity of the inflator mount portion of the airbag.

The airbag system of the embodiment is a pedestrian airbag system in which, when a car collides with a pedestrian or the like or when a collision of a car and a pedestrian or the like is predicted, a pedestrian airbag is inflated along the outer surface of the car body to protect the pedestrian or the like.

As shown in FIG. 1, a car 1 is a four-door sedan. However, the invention is not limited to a specific car. A pedestrian airbag system 4 (see FIG. 4) is disposed at the rear of a bonnet hood 3. As shown in FIG. 2, when the airbag 5 of the pedestrian airbag system 4 inflates, the part from the rear of the hood 3 to the lower part of a windshield 6 and at least part of right and left A-pillars 7 are covered with the airbag 5.

That is, as shown in FIG. 3, the airbag 5 of this embodiment has a substantially U-shape composed of a hood cover portion 5a that covers the part from the rear of the hood 3 to the lower part of the windshield 6 and a pair of pillar cover portions 5b connecting to the right and left ends of the hood cover portion 5a and deploying along the right and left A-pillars 7 to cover at least the lower ends of the A-pillars 7. The shape of the deployment of the airbag 5 is not limited to that; for example, it may be a substantially rectangular shape covering the part from the rear of the hood to the windshield and almost the entire A-pillars or may be a substantially H-shape having a pair of fender cover portions which deploys from the right and left ends of the hood cover portion 5a so as to cover the right and left fenders.

As shown in FIG. 4, the pedestrian airbag system 4 includes a case 8 for housing the airbag 5 in a folded state, inflators 9 (9L and 9R) for inflating the airbag 5, and a lid 10 that closes an airbag through opening 3a of the hood 3.

The case 8 is a long box extending along the width of the car. The case 8 has a bottom 8a, a front wall 8b, and a rear wall 8c, and is open at the top. In this embodiment, the folded airbag 5 is placed from the right end to the left end of the case 8.

The inflators 9 (9L and 9R) are disposed in the airbag 5. As shown in FIG. 3, in this embodiment, the inflators 9L and 9R are disposed at the left half and the right half of the hood cover portion 5a of the airbag 5, respectively. As shown in FIG. 5a, the inflators 9 of this embodiment are shaped like a rod, each of which has a gas exhaust nozzle 9a at one end of its length and has an initiator (not shown) at the other end. From the rear end of each inflator 9, a harness 9b for passing electricity to the initiator extends. One end of the harness 9b has a connector (not shown).

As shown in FIG. 3, the inflators 9L and 9R are disposed along the length of the hood cover portion 5a (along the width of the car), with the gas exhaust nozzle 9a pointed in opposite directions.

In this embodiment, as shown in FIG. 5a, the inflators each have an inflator holder 11, from which a plurality of (in this embodiment, three) stud bolts 12 project in different position of the length of the inflator 9.

The inflator holder 11 of this embodiment has a base 11a placed on the bottom of the airbag 5 and a plurality of (in this embodiment, three) arched portions 11b lying over the base 11a. The base 11a extends along the length of the inflator 9. The arched portions 11b retain the inflator 9 to the base 11a in such a manner as to wrap the outer circumference at the front end, the center of the length, and the rear end of the inflator 9. Three stud bolts 12 extend from the lower surface of the base 11a. In this embodiment, the stud bolts 12 are disposed at the front end, the center of the length, and the rear end of the inflator 9. However, the structure of the inflator holder is not limited to that.

As shown in FIGS. 5a and 5b, the right and left inflator mount areas of the bottom of the hood cover portion 5a each have bolt insertion holes 20 through which the stud bolts 12 are passed, an inflator insertion opening 21 through which the inflator 9 is inserted into the airbag 5, and a harness through opening 22 through which the harness 9b is taken out of the airbag 5.

More specifically, in this embodiment, three bolt insertion holes 20 are provided in the inflator mount areas of the bottom of the hood cover portion 5a, substantially at the same intervals as those of the stud bolts 12.

The inflator insertion opening 21 of the embodiment is shaped like a slit, which is provided between the bolt insertion hole 20 through which the stud bolt 12 at the front end of the inflator 9 is passed and the bolt insertion hole 20 through which the stud bolt 12 at the center of the length of the inflator 9 is passed. The inflator insertion opening 21 extend along the line connecting the bolt insertion holes 20, whose both ends each connect to the bolt insertion hole 20.

The harness through opening 22 is provided between the bolt insertion hole 20 through which the stud bolt 12 at the center of the length of the inflator 9 is passed and the bolt insertion hole 20 through which the stud bolt 12 at the rear end of the inflator 9 is passed (in the center between the bolt insertion holes 20). In this embodiment, the harness through opening 22 is shaped like a slit, which extends in the direction substantially orthogonal to the line connecting the bolt insertion holes 20. Reference numeral 22a denotes small holes at both ends of the slit-shaped harness through opening 22. Both ends of the harness through opening 22 connect to the small holes 22a.

As shown in FIG. 5b, at least half, or more preferably, most of the harness through opening 22 is provided in the region S of the bottom of the hood cover portion 5a, on which the base 11a of the inflator holder 11 is placed (the region indicated by the alternate long and short dashed lines in FIG. 5b). Only one end of the harness through opening 22 and one small hole 22a connecting thereto are located outside the region S. The bolt insertion holes 20 and the inflator insertion opening 21 are disposed within the region S.

The procedure for mounting the inflator 9 will next be described.

First, the inflator 9 and the whole of the harness 9b connecting to the inflator 9 are inserted into the airbag 5 through the inflator insertion opening 21. Next, the harness 9b is taken out of the airbag 5 through the harness through opening 22.

At that time, the large-diameter portion of the harness 9b including the connector (not shown) at the end of the harness 9b is taken out of the airbag 5, with the harness through opening 22 stretched out. Next, when only the lead portion of the harness 9b is left in the airbag 5, the lead portion is passed through the small hole 22a located outside the region on which the base 11a of the inflator holder 11 is placed.

After that, the stud bolts 12 are taken out of the airbag 5 through the bolt insertion holes 20.

The stud bolts 12 taken out of the airbag 5 are inserted into bolt insertion holes (their reference numerals are omitted) of the bottom 8a of the case 8, to which nuts 13 are tightened from the back of the case 8, so that the inflator 9 and the airbag 5 are fixed to the bottom 8a. At that time, the periphery of the inflator insertion opening 21 and the periphery of the harness through opening 22 on the bottom of the hood cover portion 5a are sandwiched between the bottom 8a and the base 11a of the inflator holder 11 so that the inflator insertion opening 21 and the harness through opening 22 are closed.

The harnesses 9b of the inflators 9 which are taken out of the airbag 5 are each connected to an inflator control circuit (not shown). In response to start signals from the inflator control circuits, the initiators of the inflators 9 are activated to cause the inflators 9 to eject gas.

The part of the lid 10 adjacent to the rear of the car is fixed to the car body with a hinge (not shown) at the rear of the opening 3a of the hood 3. When the airbag 5 inflates, the lid 10 is turned open toward the rear, as indicated by the arrow θ of FIG. 4. The front ridge of the lid 10 is fixed to the car body at the front edge of the opening 3a with retaining means such as a clip (not shown). The retaining means is configured to cancel the retaining when the lid 10 is opened by the pressure of the airbag 5.

Although not shown, the car 1 equipped with the pedestrian airbag system 4 has a sensor for detecting or predicting a collision with a pedestrian or the like or a sensor for predicting a collision with a pedestrian or the like. Both of the detection sensor and the prediction sensor may be provided. The inflator control circuits activate the initiators of the inflators according to the detection signals or the prediction signals from the sensors.

The operation of the pedestrian airbag system 4 with this structure is as follows:

When a collision of the car 1 with a pedestrian or the like is detected by the sensor, or when a collision of the car 1 with a pedestrian or the like is predicted, start signals are input to the initiators of the inflators 9 from the inflator control circuits to activate the initiators, so that the inflators 9 eject gas. The airbag 5 is inflated by the gas from the inflators 9 to push the lid 10 open into deployment along the outer surface of the car body, as shown in FIG. 2.

The airbag system 4 has a structure in which the harness through opening 22 for taking the harness 9b of each inflator 9 out of the airbag 5 is disposed between the bolt insertion holes 20 for the stud bolts 12 of the inflator 9, that is, under the middle of the length of the inflator 9. This prevents the vicinity of the harness through opening 22 from coming into contact with the end of each inflator 9 even if the part of the bottom of the airbag 5 around the inflator rises with the inflation of the airbag 5. This provides the airbag 5 with high durability even if the periphery of the harness through opening 22 is not excessively reinforced.

Since the harness through opening 22 of the embodiment is shaped like a slit, the closing performance of the harness through opening 22 is good. Since the slit-shaped harness through opening 22 is provided in the direction orthogonal to the line connecting the bolt insertion holes 20, the base 11a of the inflator holder 11 crosses over the slit-shaped harness through opening 22, so that the effect of closing the harness through opening 22 by the inflator holder 11 is large.

Figure 6A:
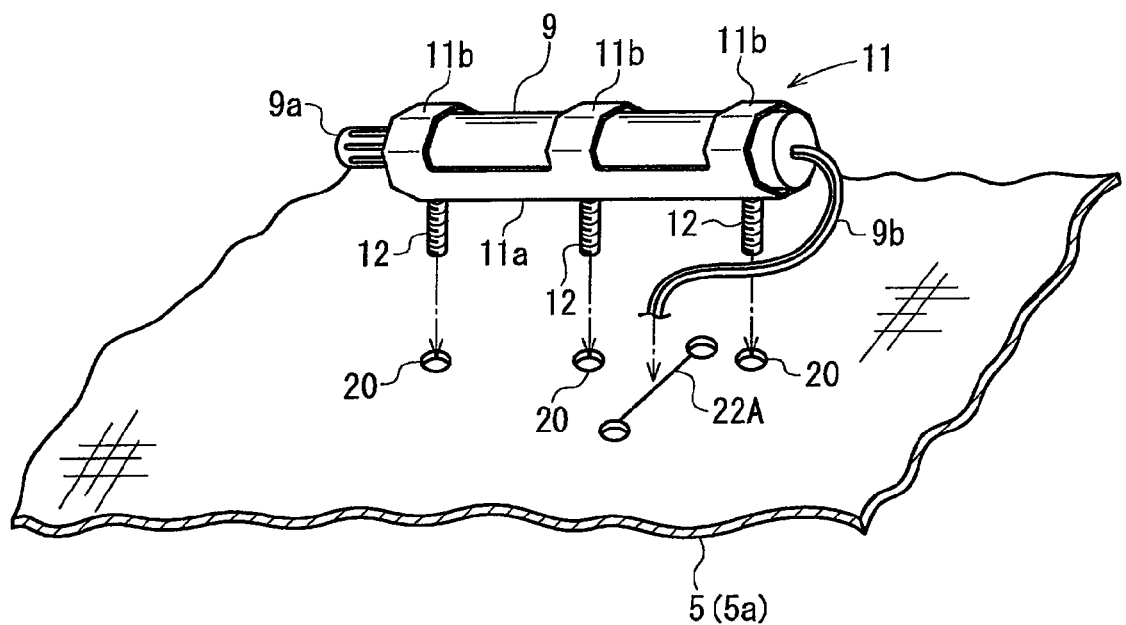
FIGS. 6*a* and 6*b* are diagrams illustrating the vicinity of the inflator mount portion according to another embodiment.
Figure 6B:
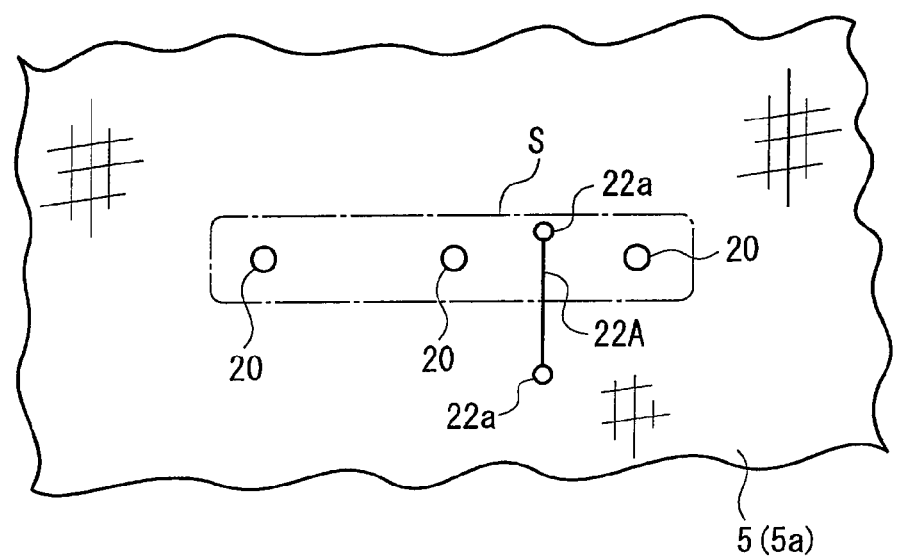

While in the embodiment the harness through opening 22 and the inflator insertion opening 21 are provided separately, the inflator insertion opening may be omitted and the inflator may also be taken into the airbag through the harness through opening. FIGS. 6a and 6b show an example of this airbag. FIG. 6a is an exploded perspective view of the vicinity of the inflator mount portion of the airbag; and FIG. 6b is a plan view of the vicinity of the inflator mount portion.

The embodiment shown in FIGS. 6a and 6b has a structure in which the inflator insertion opening 21 of the embodiment of FIGS. 1 to 5b is omitted, and the harness through opening 22 is extended to form an inflator and harness insertion opening 22A so that the inflator 9 (and the inflator holder 11) can pass therethrough.

That is, this embodiment is also constructed such that the inflator and harness insertion opening 22A are shaped like a slit, which is placed between the bolt insertion holes 20 of the bottom of the airbag 5 through which the stud bolts 12 of the inflator 9 are inserted, and extends in the direction substantially orthogonal to the line connecting the bolt insertion holes 20.

As shown in FIG. 6b, this embodiment is also constructed such that one end of the inflator and harness insertion opening 22A is located in the region S of the bottom of the airbag 5 on which the base 11a of the inflator holder 11 placed, and the other end extends out of the region S.

The length of the harness through opening 22 of the embodiment shown in FIGS. 1 to 5b through which only the harness 9b is passed is generally set from 20 to 35 mm, and more particularly, to about 25 mm. In contrast, the length of the inflator and harness insertion opening 22A that serves as the insertion opening for both of the inflator 9 and the inflator holder 11 is set from 55 to 90 mm, and more particularly, to about 70 mm.

The other structure of this embodiment is the same as that of FIGS. 1 to 5b, wherein like and corresponding parts in each of the drawings are identified by the same reference numerals.

In this embodiment, the inflator 9 is taken into the airbag 5 and the harness 9b is taken out of the airbag 5 through the inflator and harness insertion opening 22A. This decreases the number of processing steps needed to manufacture the airbag 5 as compared with the case in which the airbag 5 has two insertion openings for the inflator and the harness.

If the harness 9b is left in the inflator and harness insertion opening 22A when the inflator 9 is inserted into the airbag 5 through the inflator and harness insertion opening 22A, the labor for taking the harness 9b out of the airbag 5 can be saved. However, it is needless to say that after the whole inflator 9 (including the harness 9b) has been inserted into the airbag 5 through the inflator and harness insertion opening 22A, only the harness 9b may be taken out of the airbag 5 through the inflator and harness insertion opening 22A.

The inflator and harness insertion opening 22A of this embodiment is also disposed between the bolt insertion holes 20 for the stud bolts 12 of the inflator 9, that is, under the middle of the length of the inflator 9. This prevents the vicinity of the inflator and harness insertion opening 22A from coming into contact with the end of each inflator 9 even if the part of the bottom of the airbag 5 around the inflator rises with the inflation of the airbag 5. This provides the airbag 5 with high durability even if the periphery of the inflator and harness insertion opening 22A is not excessively reinforced.

It is to be understood that the foregoing embodiments are examples of the invention, and that the invention is not limited to those embodiments.

For example, although the inflator 9 of the foregoing embodiments has the inflator holder 11 with stud bolts 12, the inflator itself may have mounting bolts projecting therefrom. In this case, the inflator holder 11 may be omitted. In the case without the inflator holder 11, the inflator 9 is placed directly on the region S.

Although the inflator of the foregoing embodiments has three mounting bolts, the number of the mounting bolts is not limited to that, it may be two or four or more.

Although the harness through openings 22 and 22A of the foregoing embodiments are shaped like a slit, the shape of the harness through opening is not limited to that.

While the described embodiments are applications of the invention to a pedestrian airbag and a pedestrian airbag system, it should be understood that the invention can be applied to various airbags and airbag systems other than those for a pedestrian, for example, a knee airbag that inflates toward the front of the occupant of a car in the event of a collision to retrain the legs of the occupant.

The invention claimed is:

1. An airbag system comprising:
   an airbag having a plurality of bolt insertion holes;
   an inflator disposed in the airbag;
   bolts passed through the bolt insertion holes of the airbag, for fixing the inflator;
   a harness insertion opening for passing a harness connected to the inflator therethrough and being disposed between the bolt insertion holes; and
   said harness connecting to the inflator and taken out of the airbag through the harness insertion opening,
   wherein at least one of the bolts projects from the inflator or an inflator holder, the harness insertion opening is shaped like a slit that extends in a direction orthogonal to a line connecting the bolt insertion holes, the inflator or the inflator holder overlaps with most of the harness insertion opening to form an overlapping region, and a first end of the harness insertion opening extends out of the overlapping region.

2. The airbag system according to claim 1, wherein the airbag has a small hole connecting to the first end of the harness insertion opening, and the harness is taken out of the airbag through the small hole.

3. The airbag system according to claim 1, wherein the airbag is housed in a case and the bolts are fixed to the case with nuts.

* * * * *